US007920136B2

(12) United States Patent
Stewart et al.

(10) Patent No.: US 7,920,136 B2
(45) Date of Patent: Apr. 5, 2011

(54) SYSTEM AND METHOD OF DRIVING A MEMS DISPLAY DEVICE

(75) Inventors: Richard A. Stewart, San Diego, CA (US); Clarence Chui, San Mateo, CA (US); Robert S. Hastings, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1028 days.

(21) Appl. No.: 11/413,239

(22) Filed: Apr. 28, 2006

(65) Prior Publication Data

US 2006/0250335 A1 Nov. 9, 2006

Related U.S. Application Data

(60) Provisional application No. 60/678,361, filed on May 5, 2005.

(51) Int. Cl.
*G06F 3/038* (2006.01)
*G09G 5/00* (2006.01)

(52) U.S. Cl. ........................................ 345/204; 359/237

(58) Field of Classification Search .................... 345/79, 345/204, 100, 209, 96; 359/237–324
See application file for complete search history.

(56) References Cited

U.S. PATENT DOCUMENTS

| | | | | |
|---|---|---|---|---|
| 3,982,239 A | | 9/1976 | Sherr | |
| 4,403,248 A | | 9/1983 | te Velde | |
| 4,441,791 A | | 4/1984 | Hornbeck | |
| 4,459,182 A | | 7/1984 | te Velde | |
| 4,482,213 A | | 11/1984 | Piliavin et al. | |
| 4,500,171 A | | 2/1985 | Penz et al. | |
| 4,519,676 A | | 5/1985 | te Velde | |
| 4,566,935 A | | 1/1986 | Hornbeck | |
| 4,571,603 A | | 2/1986 | Hornbeck et al. | |
| 4,596,992 A | | 6/1986 | Hornbeck | |
| 4,615,595 A | | 10/1986 | Hornbeck | |
| 4,662,746 A | | 5/1987 | Hornbeck | |
| 4,681,403 A | | 7/1987 | te Velde et al. | |
| 4,705,345 A | * | 11/1987 | Ayliffe et al. | 345/97 |
| 4,709,995 A | | 12/1987 | Kuribayashi et al. | |

(Continued)

FOREIGN PATENT DOCUMENTS

EP 0295802 A 12/1988

(Continued)

OTHER PUBLICATIONS

Webster's New World Computer Dictionary. Published 2003. Entry for Random Number Generator.*

(Continued)

*Primary Examiner* — Amr Awad
*Assistant Examiner* — Liliana Cerullo
(74) *Attorney, Agent, or Firm* — Knobbe Martens Olson & Bear LLP

(57) ABSTRACT

Methods of writing display data to MEMS display elements are configured to minimize charge buildup and differential aging. Simultaneous to writing rows of image data, a pre-write operation is performed on a next row. The pre-write operation writes either image data or the inverse of the image data to the next row. In some embodiments, the selection between writing image data and writing inverse image data is performed in a random or pseudo-random manner.

35 Claims, 13 Drawing Sheets

U.S. PATENT DOCUMENTS 4,710,732 A 12/1987 Hornbeck
4,856,863 A 8/1989 Sampsell et al.
4,859,060 A 8/1989 Katagiri et al.
4,954,789 A 9/1990 Sampsell
4,956,619 A 9/1990 Hornbeck
4,982,184 A 1/1991 Kirkwood
5,018,256 A 5/1991 Hornbeck
5,028,939 A 7/1991 Hornbeck et al.
5,037,173 A 8/1991 Sampsell et al.
5,055,833 A 10/1991 Hehlen et al.
5,061,049 A 10/1991 Hornbeck
5,078,479 A 1/1992 Vuilleumier
5,079,544 A 1/1992 DeMond et al.
5,083,857 A 1/1992 Hornbeck
5,096,279 A 3/1992 Hornbeck et al.
5,099,353 A 3/1992 Hornbeck
5,124,834 A 6/1992 Cusano et al.
5,142,405 A 8/1992 Hornbeck
5,142,414 A 8/1992 Koehler
5,162,787 A 11/1992 Thompson et al.
5,168,406 A 12/1992 Nelson
5,170,156 A 12/1992 DeMond et al.
5,172,262 A 12/1992 Hornbeck
5,179,274 A 1/1993 Sampsell
5,192,395 A 3/1993 Boysel et al.
5,192,946 A 3/1993 Thompson et al.
5,206,629 A 4/1993 DeMond et al.
5,212,582 A 5/1993 Nelson
5,214,419 A 5/1993 DeMond et al.
5,214,420 A 5/1993 Thompson et al.
5,216,537 A 6/1993 Hornbeck
5,226,099 A 7/1993 Mignardi et al.
5,227,900 A 7/1993 Inaba et al.
5,231,532 A 7/1993 Magel et al.
5,233,385 A 8/1993 Sampsell
5,233,456 A 8/1993 Nelson
5,233,459 A 8/1993 Bozler et al.
5,254,980 A 10/1993 Hendrix et al.
5,272,473 A 12/1993 Thompson et al.
5,278,652 A 1/1994 Urbanus et al.
5,280,277 A 1/1994 Hornbeck
5,285,196 A 2/1994 Gale
5,287,096 A 2/1994 Thompson et al.
5,287,215 A 2/1994 Warde et al.
5,296,950 A 3/1994 Lin et al.
5,305,640 A 4/1994 Boysel et al.
5,312,513 A 5/1994 Florence et al.
5,323,002 A 6/1994 Sampsell et al.
5,325,116 A 6/1994 Sampsell
5,327,286 A 7/1994 Sampsell et al.
5,331,454 A 7/1994 Hornbeck
5,339,116 A 8/1994 Urbanus et al.
5,365,283 A 11/1994 Doherty et al.
5,411,769 A 5/1995 Hornbeck
5,444,566 A 8/1995 Gale et al.
5,446,479 A 8/1995 Thompson et al.
5,448,314 A 9/1995 Heimbuch et al.
5,452,024 A 9/1995 Sampsell
5,454,906 A 10/1995 Baker et al.
5,457,493 A 10/1995 Leddy et al.
5,457,566 A 10/1995 Sampsell et al.
5,459,602 A 10/1995 Sampsell
5,461,411 A 10/1995 Florence et al.
5,488,505 A 1/1996 Engle
5,489,952 A 2/1996 Gove et al.
5,497,172 A 3/1996 Doherty et al.
5,497,197 A 3/1996 Gove et al.
5,499,062 A 3/1996 Urbanus
5,506,597 A 4/1996 Thompson et al.
5,515,076 A 5/1996 Thompson et al.
5,517,347 A 5/1996 Sampsell
5,523,803 A 6/1996 Urbanus et al.
5,526,051 A 6/1996 Gove et al.
5,526,172 A 6/1996 Kanack
5,526,688 A 6/1996 Boysel et al.
5,535,047 A 7/1996 Hornbeck
5,548,301 A 8/1996 Kornher et al.
5,551,293 A 9/1996 Boysel et al.
5,552,924 A 9/1996 Tregilgas
5,552,925 A 9/1996 Worley
5,563,398 A 10/1996 Sampsell
5,567,334 A 10/1996 Baker et al.
5,570,135 A 10/1996 Gove et al.
5,578,976 A 11/1996 Yao
5,581,272 A 12/1996 Conner et al.
5,583,688 A 12/1996 Hornbeck
5,589,852 A 12/1996 Thompson et al.
5,597,736 A 1/1997 Sampsell
5,598,565 A 1/1997 Reinhardt
5,600,383 A 2/1997 Hornbeck
5,602,671 A 2/1997 Hornbeck
5,606,441 A 2/1997 Florence et al.
5,608,468 A 3/1997 Gove et al.
5,610,438 A 3/1997 Wallace et al.
5,610,624 A 3/1997 Bhuva
5,610,625 A 3/1997 Sampsell
5,612,713 A 3/1997 Bhuva et al.
5,619,061 A 4/1997 Goldsmith et al.
5,619,365 A 4/1997 Rhoades et al.
5,619,366 A 4/1997 Rhoads et al.
5,629,790 A 5/1997 Neukermans et al.
5,633,652 A 5/1997 Kanbe et al.
5,636,052 A 6/1997 Arney et al.
5,638,084 A 6/1997 Kalt
5,638,946 A 6/1997 Zavracky
5,646,768 A 7/1997 Kaeriyama
5,650,881 A 7/1997 Hornbeck
5,654,741 A 8/1997 Sampsell et al.
5,657,099 A 8/1997 Doherty et al.
5,659,374 A 8/1997 Gale, Jr. et al.
5,665,997 A 9/1997 Weaver et al.
5,745,193 A 4/1998 Urbanus et al.
5,745,281 A 4/1998 Yi et al.
5,754,160 A 5/1998 Shimizu et al.
5,771,116 A 6/1998 Miller et al.
5,784,189 A 7/1998 Bozler et al.
5,784,212 A 7/1998 Hornbeck
5,793,350 A * 8/1998 Chandavarkar et al. ...... 345/667
5,808,780 A 9/1998 McDonald
5,818,095 A 10/1998 Sampsell
5,828,367 A 10/1998 Kuga
5,835,255 A 11/1998 Miles
5,842,088 A 11/1998 Thompson
5,867,302 A 2/1999 Fleming
5,912,758 A 6/1999 Knipe et al.
5,943,158 A 8/1999 Ford et al.
5,959,763 A 9/1999 Bozler et al.
5,966,235 A 10/1999 Walker
5,986,796 A 11/1999 Miles
6,028,690 A 2/2000 Carter et al.
6,038,056 A 3/2000 Florence et al.
6,040,937 A 3/2000 Miles
6,049,317 A 4/2000 Thompson et al.
6,055,090 A 4/2000 Miles
6,061,075 A 5/2000 Nelson et al.
6,099,132 A 8/2000 Kaeriyama
6,100,872 A 8/2000 Aratani et al.
6,113,239 A 9/2000 Sampsell et al.
6,147,790 A 11/2000 Meier et al.
6,160,833 A 12/2000 Floyd et al.
6,180,428 B1 1/2001 Peeters et al.
6,201,633 B1 3/2001 Peeters et al.
6,232,936 B1 5/2001 Gove et al.
6,275,326 B1 8/2001 Bhalla et al.
6,281,866 B1 * 8/2001 Robinson et al. ............... 345/87
6,282,010 B1 8/2001 Sulzbach et al.
6,295,154 B1 9/2001 Laor et al.
6,304,297 B1 10/2001 Swan
6,323,982 B1 11/2001 Hornbeck
6,327,071 B1 12/2001 Kimura
6,356,085 B1 3/2002 Ryat et al.
6,356,254 B1 3/2002 Kimura
6,429,601 B1 8/2002 Friend et al.
6,433,917 B1 8/2002 Mei et al.
6,447,126 B1 9/2002 Hornbeck
6,465,355 B1 10/2002 Horsley
6,466,358 B2 10/2002 Tew

| | | | |
|---|---|---|---|
| 6,473,274 | B1 | 10/2002 | Maimone et al. |
| 6,480,177 | B2 | 11/2002 | Doherty et al. |
| 6,496,122 | B2 | 12/2002 | Sampsell |
| 6,501,107 | B1 | 12/2002 | Sinclair et al. |
| 6,507,330 | B1 | 1/2003 | Handschy et al. |
| 6,507,331 | B1 | 1/2003 | Schlangen et al. |
| 6,545,335 | B1 | 4/2003 | Chua et al. |
| 6,548,908 | B2 | 4/2003 | Chua et al. |
| 6,549,338 | B1 | 4/2003 | Wolverton et al. |
| 6,552,840 | B2 | 4/2003 | Knipe |
| 6,574,033 | B1 | 6/2003 | Chui et al. |
| 6,589,625 | B1 | 7/2003 | Kothari et al. |
| 6,593,934 | B1 | 7/2003 | Yang et al. |
| 6,600,201 | B2 | 7/2003 | Hartwell et al. |
| 6,606,175 | B1 | 8/2003 | Sampsell et al. |
| 6,625,047 | B2 | 9/2003 | Coleman, Jr. |
| 6,630,786 | B2 | 10/2003 | Cummings et al. |
| 6,632,698 | B2 | 10/2003 | Ives |
| 6,636,187 | B2 | 10/2003 | Tajima et al. |
| 6,643,069 | B2 | 11/2003 | Dewald |
| 6,650,455 | B2 | 11/2003 | Miles |
| 6,666,561 | B1 | 12/2003 | Blakley |
| 6,674,090 | B1 | 1/2004 | Chua et al. |
| 6,674,562 | B1 | 1/2004 | Miles |
| 6,680,792 | B2 | 1/2004 | Miles |
| 6,710,908 | B2 | 3/2004 | Miles et al. |
| 6,741,377 | B2 | 5/2004 | Miles |
| 6,741,384 | B1 | 5/2004 | Martin et al. |
| 6,741,503 | B1 | 5/2004 | Farris et al. |
| 6,747,785 | B2 | 6/2004 | Chen et al. |
| 6,762,873 | B1 | 7/2004 | Coker et al. |
| 6,775,174 | B2 | 8/2004 | Huffman et al. |
| 6,778,155 | B2 | 8/2004 | Doherty et al. |
| 6,781,643 | B1 | 8/2004 | Watanabe et al. |
| 6,787,384 | B2 | 9/2004 | Okumura |
| 6,787,438 | B1 | 9/2004 | Nelson |
| 6,788,520 | B1 | 9/2004 | Behin et al. |
| 6,794,119 | B2 | 9/2004 | Miles |
| 6,811,267 | B1 | 11/2004 | Allen et al. |
| 6,813,060 | B1 | 11/2004 | Garcia et al. |
| 6,819,469 | B1 | 11/2004 | Koba |
| 6,822,628 | B2 | 11/2004 | Dunphy et al. |
| 6,829,132 | B2 | 12/2004 | Martin et al. |
| 6,853,129 | B1 | 2/2005 | Cummings et al. |
| 6,855,610 | B2 | 2/2005 | Tung et al. |
| 6,859,218 | B1 | 2/2005 | Luman et al. |
| 6,861,277 | B1 | 3/2005 | Monroe et al. |
| 6,862,022 | B2 | 3/2005 | Slupe |
| 6,862,029 | B1 | 3/2005 | D'Souza et al. |
| 6,867,896 | B2 | 3/2005 | Miles |
| 6,870,581 | B2 | 3/2005 | Li et al. |
| 6,903,860 | B2 | 6/2005 | Ishii |
| 7,034,783 | B2 | 4/2006 | Gates et al. |
| 7,123,216 | B1 | 10/2006 | Miles |
| 7,161,728 | B2 | 1/2007 | Sampsell et al. |
| 7,400,489 | B2 | 7/2008 | Van Brocklin et al. |
| 7,515,147 | B2 * | 4/2009 | Mignard ....................... 345/204 |
| 2001/0003487 | A1 | 6/2001 | Miles |
| 2001/0026250 | A1 | 10/2001 | Inoue et al. |
| 2001/0034075 | A1 | 10/2001 | Onoya |
| 2001/0043171 | A1 | 11/2001 | Van Gorkom et al. |
| 2001/0046081 | A1 | 11/2001 | Hayashi et al. |
| 2001/0051014 | A1 | 12/2001 | Behin et al. |
| 2001/0052887 | A1 | 12/2001 | Tsutsui et al. |
| 2002/0000959 | A1 | 1/2002 | Colgan et al. |
| 2002/0005827 | A1 | 1/2002 | Kobayashi |
| 2002/0012159 | A1 | 1/2002 | Tew |
| 2002/0015215 | A1 | 2/2002 | Miles |
| 2002/0024711 | A1 | 2/2002 | Miles |
| 2002/0036304 | A1 | 3/2002 | Ehmke et al. |
| 2002/0050882 | A1 | 5/2002 | Hyman et al. |
| 2002/0054424 | A1 | 5/2002 | Miles |
| 2002/0075226 | A1 | 6/2002 | Lippincott |
| 2002/0075555 | A1 | 6/2002 | Miles |
| 2002/0093722 | A1 | 7/2002 | Chan et al. |
| 2002/0097133 | A1 | 7/2002 | Charvet et al. |
| 2002/0126364 | A1 | 9/2002 | Miles |
| 2002/0179421 | A1 | 12/2002 | Williams et al. |
| 2002/0186108 | A1 | 12/2002 | Hallbjorner |

| | | | |
|---|---|---|---|
| 2003/0004272 | A1 | 1/2003 | Power |
| 2003/0020699 | A1 | 1/2003 | Nakatani et al. |
| 2003/0043157 | A1 | 3/2003 | Miles |
| 2003/0072070 | A1 | 4/2003 | Miles |
| 2003/0122773 | A1 | 7/2003 | Washio et al. |
| 2003/0137215 | A1 | 7/2003 | Cabuz |
| 2003/0137521 | A1 | 7/2003 | Zehner et al. |
| 2003/0189536 | A1 | 10/2003 | Ruigt |
| 2003/0202264 | A1 | 10/2003 | Weber et al. |
| 2003/0202265 | A1 | 10/2003 | Reboa et al. |
| 2003/0202266 | A1 | 10/2003 | Ring et al. |
| 2004/0008396 | A1 | 1/2004 | Stappaerts |
| 2004/0021658 | A1 | 2/2004 | Chen |
| 2004/0022044 | A1 | 2/2004 | Yasuoka et al. |
| 2004/0027701 | A1 | 2/2004 | Ishikawa |
| 2004/0051929 | A1 | 3/2004 | Sampsell et al. |
| 2004/0058532 | A1 | 3/2004 | Miles et al. |
| 2004/0080807 | A1 | 4/2004 | Chen et al. |
| 2004/0136596 | A1 | 7/2004 | Oneda et al. |
| 2004/0145049 | A1 | 7/2004 | McKinnell et al. |
| 2004/0145553 | A1 | 7/2004 | Sala et al. |
| 2004/0147056 | A1 | 7/2004 | McKinnell et al. |
| 2004/0160143 | A1 | 8/2004 | Shreeve et al. |
| 2004/0174583 | A1 | 9/2004 | Chen et al. |
| 2004/0179281 | A1 | 9/2004 | Reboa |
| 2004/0212026 | A1 | 10/2004 | Van Brocklin et al. |
| 2004/0217378 | A1 | 11/2004 | Martin et al. |
| 2004/0217919 | A1 | 11/2004 | Piehl et al. |
| 2004/0218251 | A1 | 11/2004 | Piehl et al. |
| 2004/0218334 | A1 | 11/2004 | Martin et al. |
| 2004/0218341 | A1 | 11/2004 | Martin et al. |
| 2004/0223204 | A1 | 11/2004 | Mao et al. |
| 2004/0227493 | A1 | 11/2004 | Van Brocklin et al. |
| 2004/0240032 | A1 | 12/2004 | Miles |
| 2004/0240138 | A1 | 12/2004 | Martin et al. |
| 2004/0245588 | A1 | 12/2004 | Nikkel et al. |
| 2004/0263944 | A1 | 12/2004 | Miles et al. |
| 2005/0001828 | A1 | 1/2005 | Martin et al. |
| 2005/0012577 | A1 | 1/2005 | Pillans et al. |
| 2005/0024301 | A1 | 2/2005 | Funston |
| 2005/0038950 | A1 | 2/2005 | Adelmann |
| 2005/0057442 | A1 | 3/2005 | Way |
| 2005/0068583 | A1 | 3/2005 | Gutkowski et al. |
| 2005/0069209 | A1 | 3/2005 | Damera-Venkata et al. |
| 2005/0116924 | A1 | 6/2005 | Sauvante et al. |
| 2005/0206991 | A1 | 9/2005 | Chui et al. |
| 2005/0286113 | A1 | 12/2005 | Miles |
| 2005/0286114 | A1 | 12/2005 | Miles |
| 2006/0044246 | A1 | 3/2006 | Mignard |
| 2006/0044298 | A1 | 3/2006 | Mignard et al. |
| 2006/0044928 | A1 | 3/2006 | Chui et al. |
| 2006/0056000 | A1 | 3/2006 | Mignard |
| 2006/0057754 | A1 | 3/2006 | Cummings |
| 2006/0066542 | A1 | 3/2006 | Chui |
| 2006/0066559 | A1 | 3/2006 | Chui et al. |
| 2006/0066560 | A1 | 3/2006 | Gally et al. |
| 2006/0066561 | A1 | 3/2006 | Chui et al. |
| 2006/0066594 | A1 | 3/2006 | Tyger |
| 2006/0066597 | A1 | 3/2006 | Sampsell |
| 2006/0066598 | A1 | 3/2006 | Floyd |
| 2006/0066601 | A1 | 3/2006 | Kothari |
| 2006/0066935 | A1 | 3/2006 | Cummings et al. |
| 2006/0066937 | A1 | 3/2006 | Chui |
| 2006/0066938 | A1 | 3/2006 | Chui |
| 2006/0067648 | A1 | 3/2006 | Chui et al. |
| 2006/0067653 | A1 | 3/2006 | Gally et al. |
| 2006/0077127 | A1 | 4/2006 | Sampsell et al. |
| 2006/0077505 | A1 | 4/2006 | Chui et al. |
| 2006/0077520 | A1 | 4/2006 | Chui et al. |
| 2006/0103613 | A1 | 5/2006 | Chui |
| 2006/0250350 | A1 | 11/2006 | Kothari et al. |
| 2009/0219309 | A1 | 9/2009 | Sampsell |
| 2009/0219600 | A1 | 9/2009 | Gally et al. |
| 2009/0225069 | A1 | 9/2009 | Sampsell |
| 2009/0273596 | A1 | 11/2009 | Cummings |
| 2010/0026680 | A1 | 2/2010 | Chui et al. |

FOREIGN PATENT DOCUMENTS

| | | | |
|---|---|---|---|
| EP | 0300754 | A2 | 1/1989 |
| EP | 0306308 | A2 | 3/1989 |
| EP | 0318050 | A | 5/1989 |
| EP | 0 417 523 | A | 3/1991 |
| EP | 0 467 048 | A | 1/1992 |
| EP | 0570906 | A | 11/1993 |
| EP | 0608056 | A1 | 7/1994 |
| EP | 0655725 | A1 | 5/1995 |
| EP | 0667548 | A1 | 8/1995 |
| EP | 0725380 | A1 | 8/1996 |
| EP | 0852371 | A1 | 7/1998 |
| EP | 0911794 | A1 | 4/1999 |
| EP | 0 017 038 | A | 7/2000 |
| EP | 1 134 721 | | 9/2001 |
| EP | 1146533 | A | 10/2001 |
| EP | 1 239 448 | | 9/2002 |
| EP | 1 280 129 | | 1/2003 |
| EP | 1343190 | A | 9/2003 |
| EP | 1345197 | A | 9/2003 |
| EP | 1381023 | A | 1/2004 |
| EP | 1 414 011 | | 4/2004 |
| EP | 1473691 | A2 | 11/2004 |
| GB | 2401200 | A | 11/2004 |
| JP | 2000-075963 | | 4/2000 |
| JP | 2004-29571 | | 1/2004 |
| WO | WO 95/30924 | | 11/1995 |
| WO | WO 97/17628 | | 5/1997 |
| WO | WO 99/52006 | A3 | 10/1999 |
| WO | WO 01/73937 | A | 10/2001 |
| WO | WO 02/089103 | | 11/2002 |
| WO | WO 03/007049 | A1 | 1/2003 |
| WO | WO 03/015071 | A2 | 2/2003 |
| WO | WO 03/044765 | A2 | 5/2003 |
| WO | WO 03/060940 | A | 7/2003 |
| WO | WO 03/069413 | A1 | 8/2003 |
| WO | WO 03/073151 | A1 | 9/2003 |
| WO | WO 03/079323 | A | 9/2003 |
| WO | WO 03/090199 | A1 | 10/2003 |
| WO | WO 2004/006003 | A1 | 1/2004 |
| WO | WO 2004/026757 | A | 4/2004 |
| WO | WO 2004/049034 | A1 | 6/2004 |
| WO | WO 2004/054088 | | 6/2004 |

OTHER PUBLICATIONS

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

International Search Report dated Jan. 29, 2007.

Chen et al., Low peak current driving scheme for passive matrix-OLED, SID International Symposium Digest of Technical Papers, May 2003, pp. 504-507.

Bains, “Digital Paper Display Technology holds Promise for Portables”, CommsDesign EE Times (2000).

Lieberman, “MEMS Display Looks to give PDAs Sharper Image” EE Times (2004).

Lieberman, “Microbridges at heart of new MEMS displays” EE Times (2004).

Peroulis et al., Low contact resistance series MEMS switches, 2002, pp. 223-226, vol. 1, IEEE MTT-S International Microwave Symposium Digest, New York, NY.

Seeger et al., “Stabilization of Electrostatically Actuated Mechanical Devices”, (1997) International Conference on Solid State Sensors and Actuators; vol. 2, pp. 1133-1136.

International Preliminary Report on Patentability dated Jul. 2, 2007.

Official Communication dated Jul. 19, 2010 in European App. No. 06752213.6.

* cited by examiner

Column Output Signals

Row Output Signals

| | $+V_{bias}$ | $-V_{bias}$ |
|---|---|---|
| 0 | Stable | Stable |
| $+\Delta V$ | Release | Actuate |
| $-\Delta V$ | Actuate | Release |

SYSTEM AND METHOD OF DRIVING A MEMS DISPLAY DEVICE

CROSS REFERENCE TO RELATED APPLICATIONS

This application claims priority to U.S. Provisional Application No. 60/678,361, titled "System and Method for Driving a MEMS Display Device," filed May 5, 2005, which is hereby incorporated by reference, in its entirety.

BACKGROUND

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment is a method of writing data to a MEMS device having first and second input electrodes, where the MEMS device is configured to be in an actuated state when a voltage difference between the first and second electrodes is above a threshold, and the voltage difference has one of first and second polarities. The method includes randomly or pseudo-randomly selecting between the first and second polarities, and applying a voltage difference across the first and second electrodes, the applied voltage difference being above the threshold and having the selected polarity.

Another embodiment is a method of writing data to an array of MEMS devices, where each device has first and second input electrodes and is configured to be in a first state when the voltage difference between the first and second electrodes is below a first threshold, and to be in a second state when the voltage difference between the first and second electrodes is above a second threshold, and the voltage difference has one of first and second polarities. The method includes randomly or pseudo-randomly selecting a first row strobe value corresponding to one of the first and second polarities of the voltage difference between the first and second electrodes of the MEMS devices, and applying the strobe value to a first row of the array.

Another embodiment is a method of writing data to an array of MEMS devices, where each device has first and second input electrodes and is configured to be in a first state when the voltage difference between the first and second electrodes is below a first threshold, and to be in a second state when the voltage difference between the first and second electrodes is above a second threshold, where the voltage difference has one of first and second polarities. The method includes applying image data to columns of the array, and substantially simultaneously applying a first row strobe to a first row of the array and applying a second row strobe to a second row of the array.

Another embodiment is a method of writing data to an array of MEMS devices. The method includes writing image data to a first row of the array, and writing either the same image data or the inverse of the image data to a second row of the array, where writing to the first row and writing to the second row occur substantially simultaneously.

Another embodiment is a micro electromechanical system (MEMS) device, including an array of MEMS elements, where each element has first and second input electrodes. Each element is configured to be in a first state when the voltage difference between the first and second electrodes is below a first threshold, and to be in a second state when the voltage difference between the first and second electrodes is above a second threshold, where the voltage difference has one of first and second polarities. The device also includes a PN generator circuit configured to randomly or pseudo-randomly select between the first and second polarities, and a driver circuit configured to apply a first row strobe value to a first row of the array, the first row strobe value corresponding to the polarity selected by the PN generator.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As described herein, advantageous methods of driving the displays to display data can help improve display lifetime and performance. In some embodiments, pixels of the display are cleared or actuated prior to writing data to them.

Figure 1:
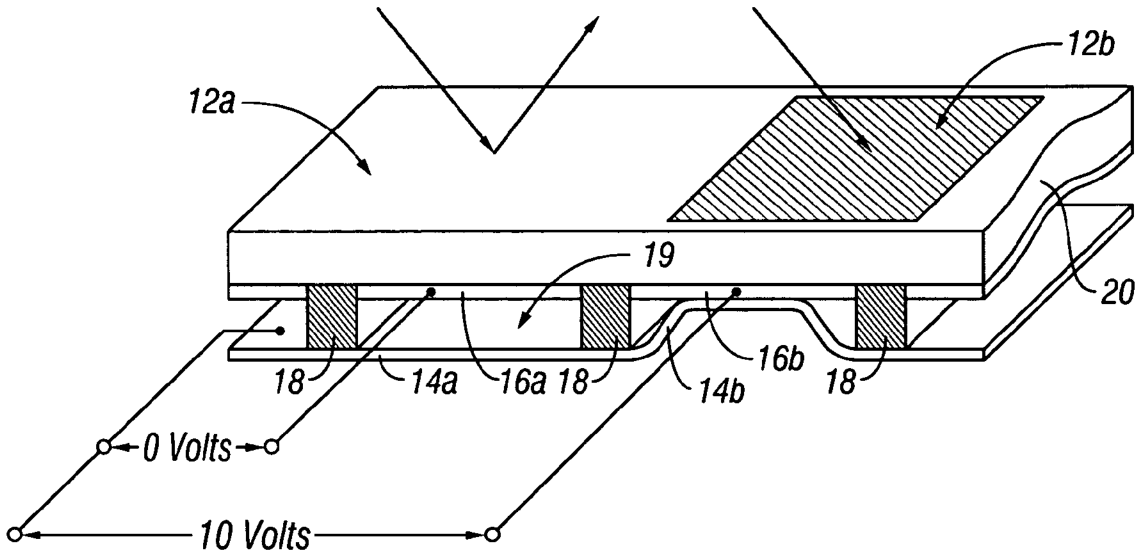
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators **12*a* and 12*b*. In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b***.

The optical stacks **16*a* and 16*b* (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14**, and these strips may form column electrodes in a display device.

With no applied voltage, the cavity 19 remains between the movable reflective layer **14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1**. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
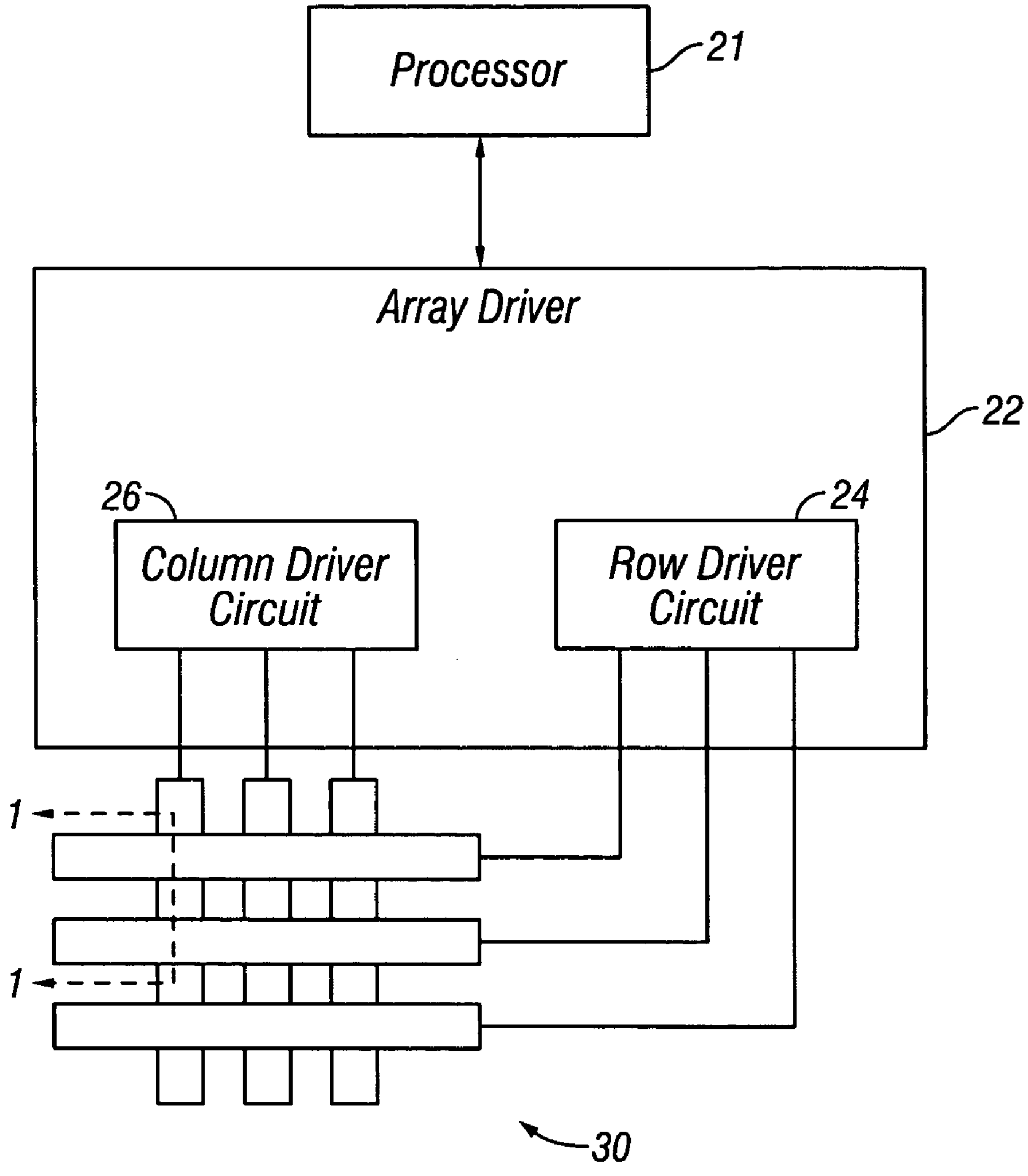
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
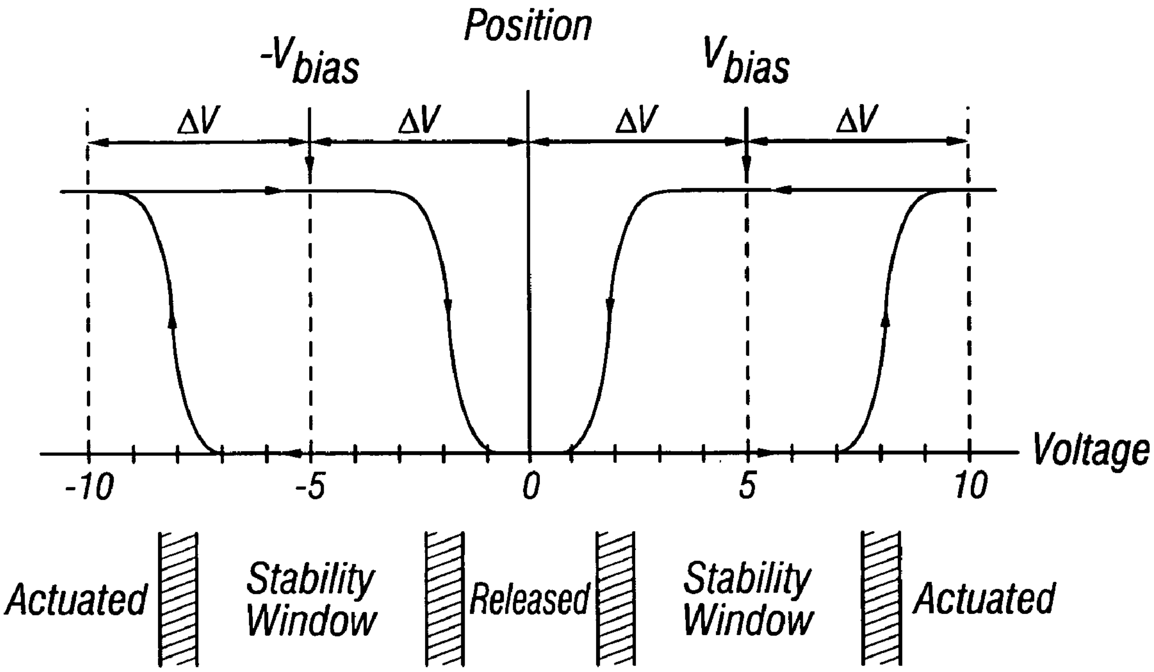
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
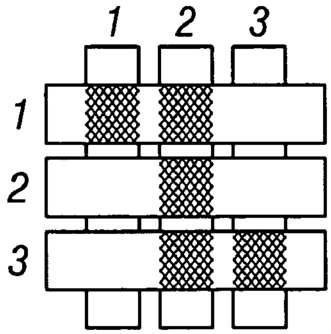
FIG. 5A illustrates one exemplary frame of display data in the 3×3 interferometric modulator display of FIG. 2.
Figure 5B:
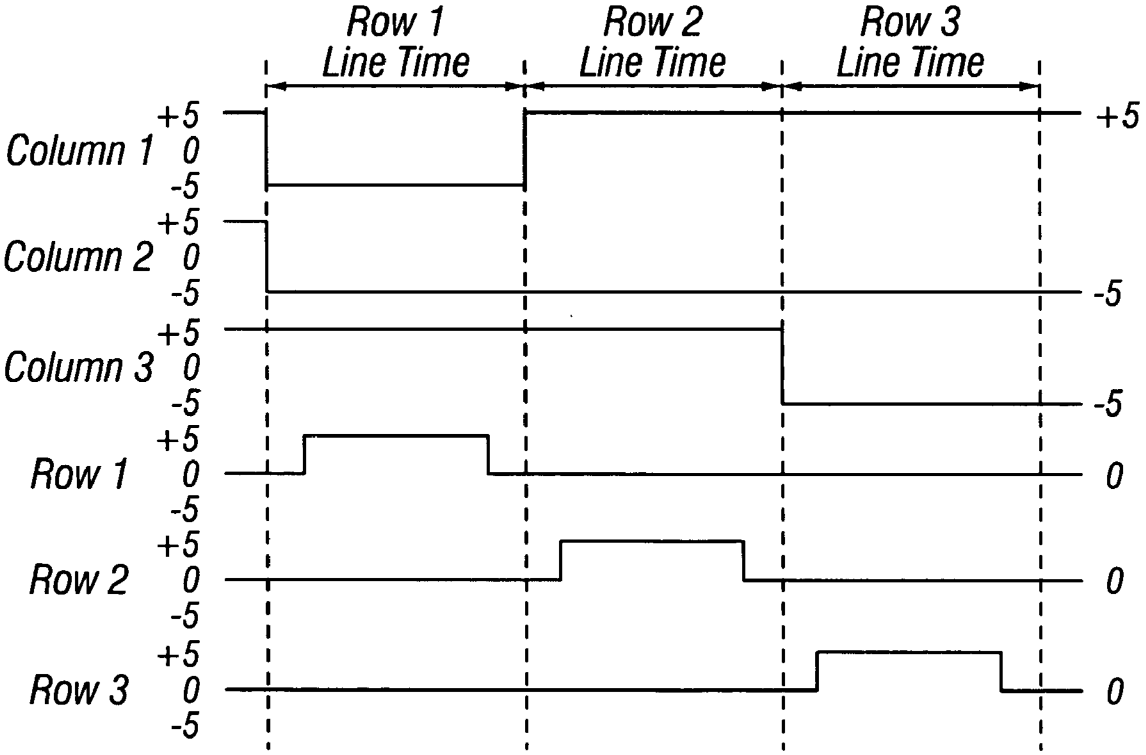
FIG. 5B illustrates one exemplary timing diagram for row and column signals that may be used to write the frame of FIG. 5A.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
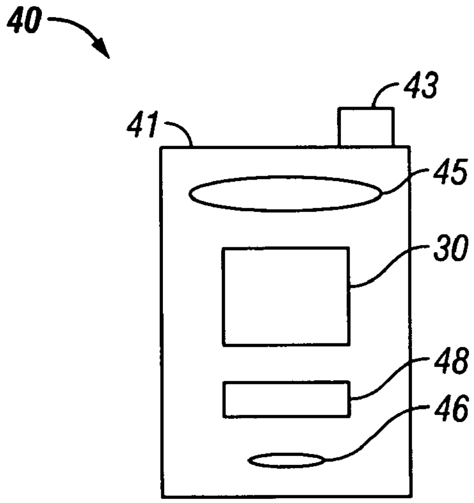
FIGS. 6A and 6B are system block diagrams illustrating an embodiment of a visual display device comprising a plurality of interferometric modulators.
Figure 6B:
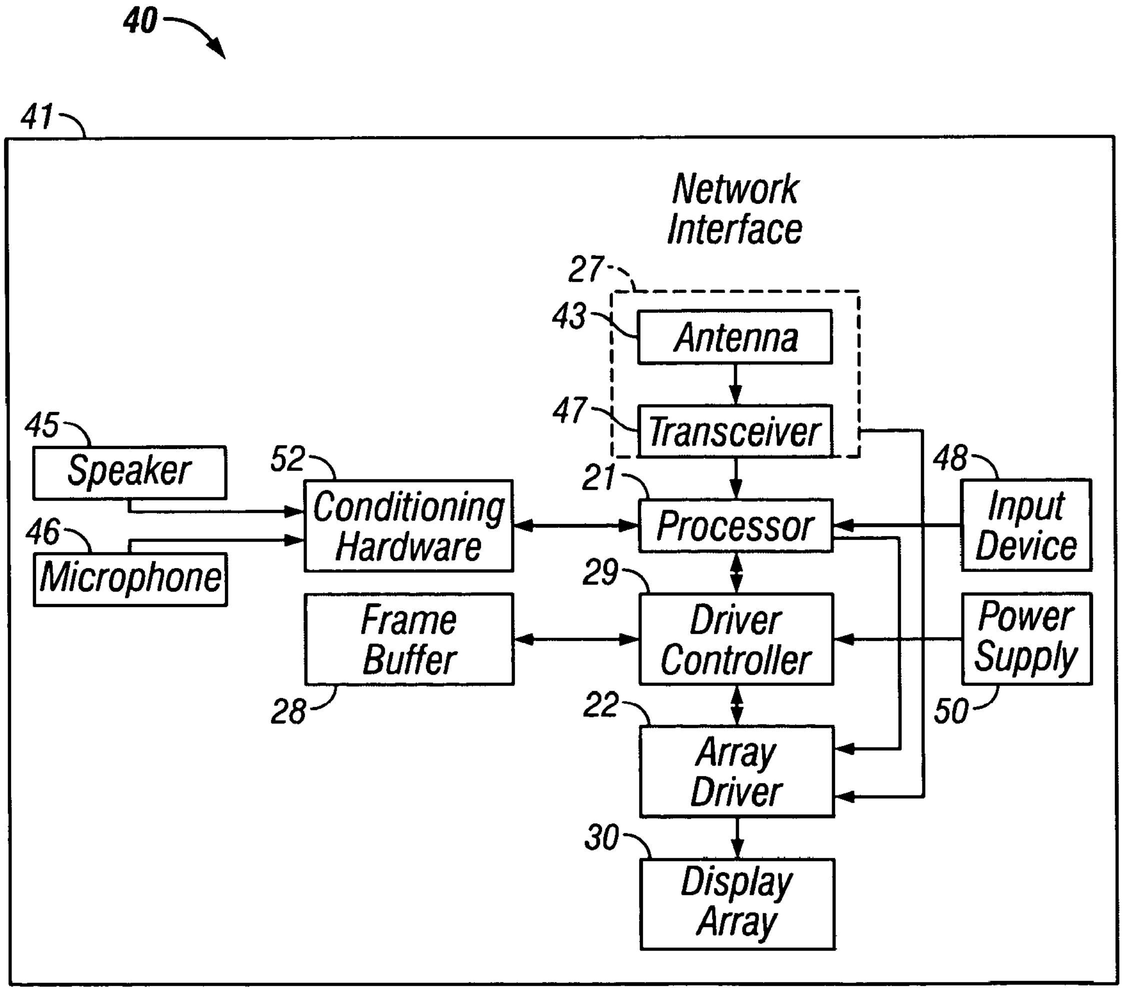

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. Other possibilities include IEEE 802.16 and ETSI HiperMAN. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
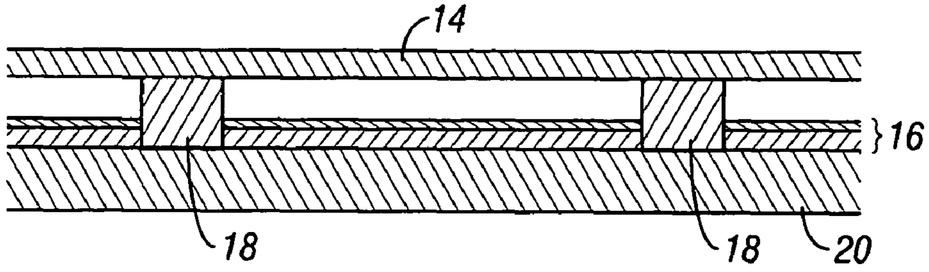
FIG. 7A is a cross section of the device of FIG. 1.
Figure 7B:
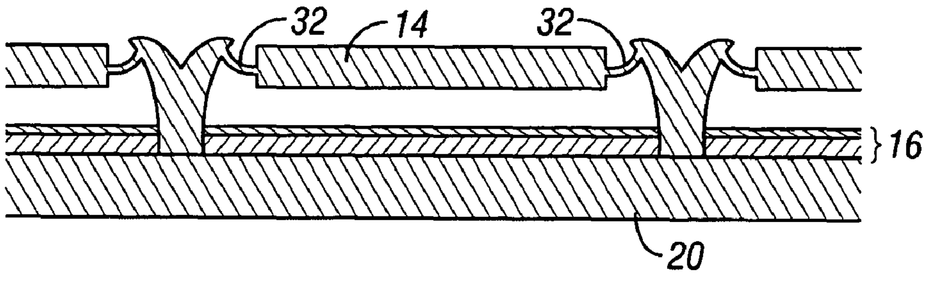
FIG. 7B is a cross section of an alternative embodiment of an interferometric modulator.
Figure 7C:
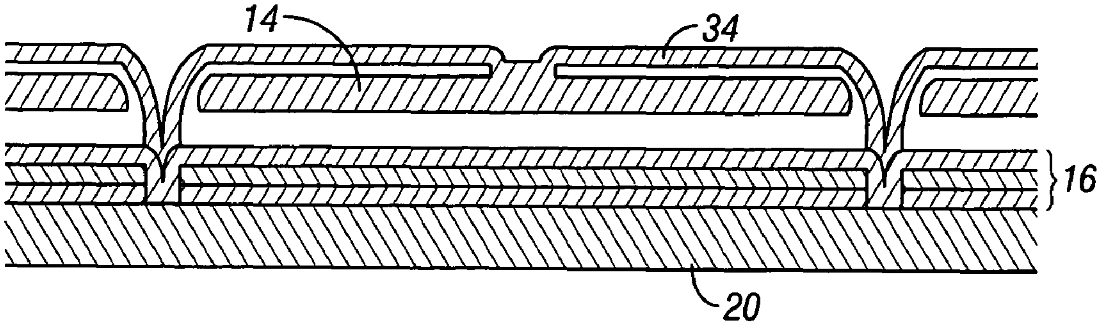
FIG. 7C is a cross section of another alternative embodiment of an interferometric modulator.
Figure 7D:
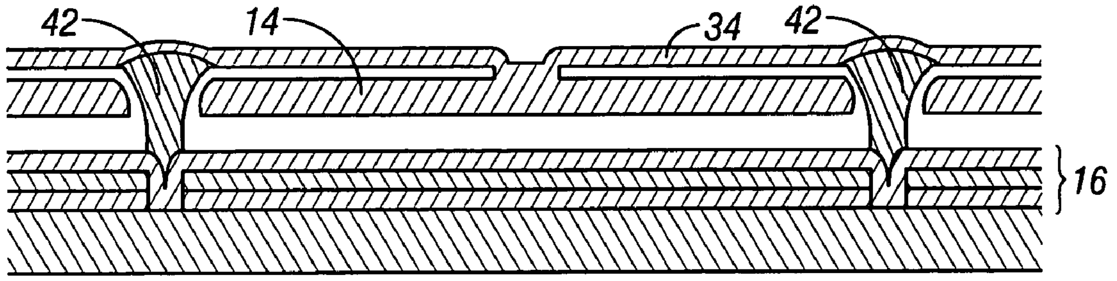
FIG. 7D is a cross section of yet another alternative embodiment of an interferometric modulator.
Figure 7E:
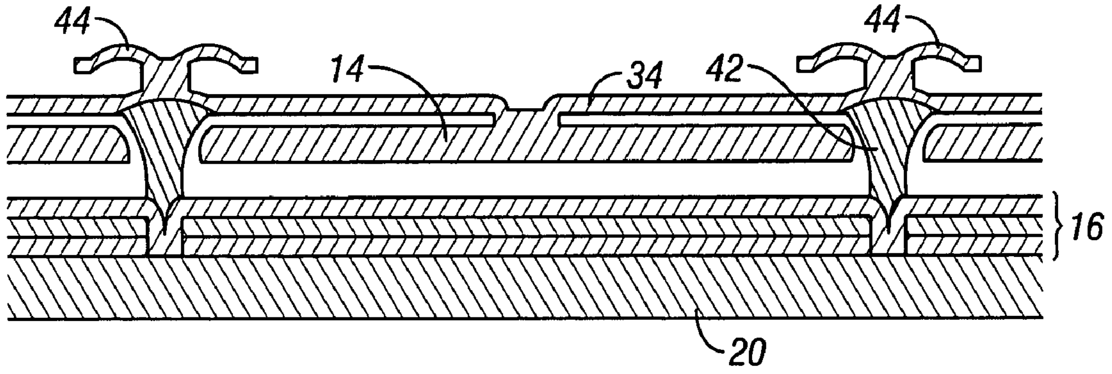
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20. In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

It is one aspect of the above described devices that charge can build on the dielectric between the layers of the device, especially when the devices are actuated and held in the actuated state by an electric field that is always in the same direction. For example, if the moving layer is always at a higher potential relative to the fixed layer when the device is actuated by potentials having a magnitude larger than the outer threshold of stability, a slowly increasing charge buildup on the dielectric between the layers can begin to shift the hysteresis curve for the device. This is undesirable as it causes display performance to change over time, and in different ways for different pixels that are actuated in different ways over time. As can be seen in the example of FIG. 5B, a given pixel sees a 10 volt difference during actuation, and every time in this example, the row electrode is at a 10 V higher potential than the column electrode. During actuation, the electric field between the plates therefore always points in one direction, from the row electrode toward the column electrode.

This problem can be reduced by actuating the MEMS display elements with a potential difference of a first polarity during a first portion of the display write process, and actuating the MEMS display elements with a potential difference having a polarity opposite the first polarity during a second portion of the display write process. This basic principle is illustrated in FIG. 8.

Figure 8:
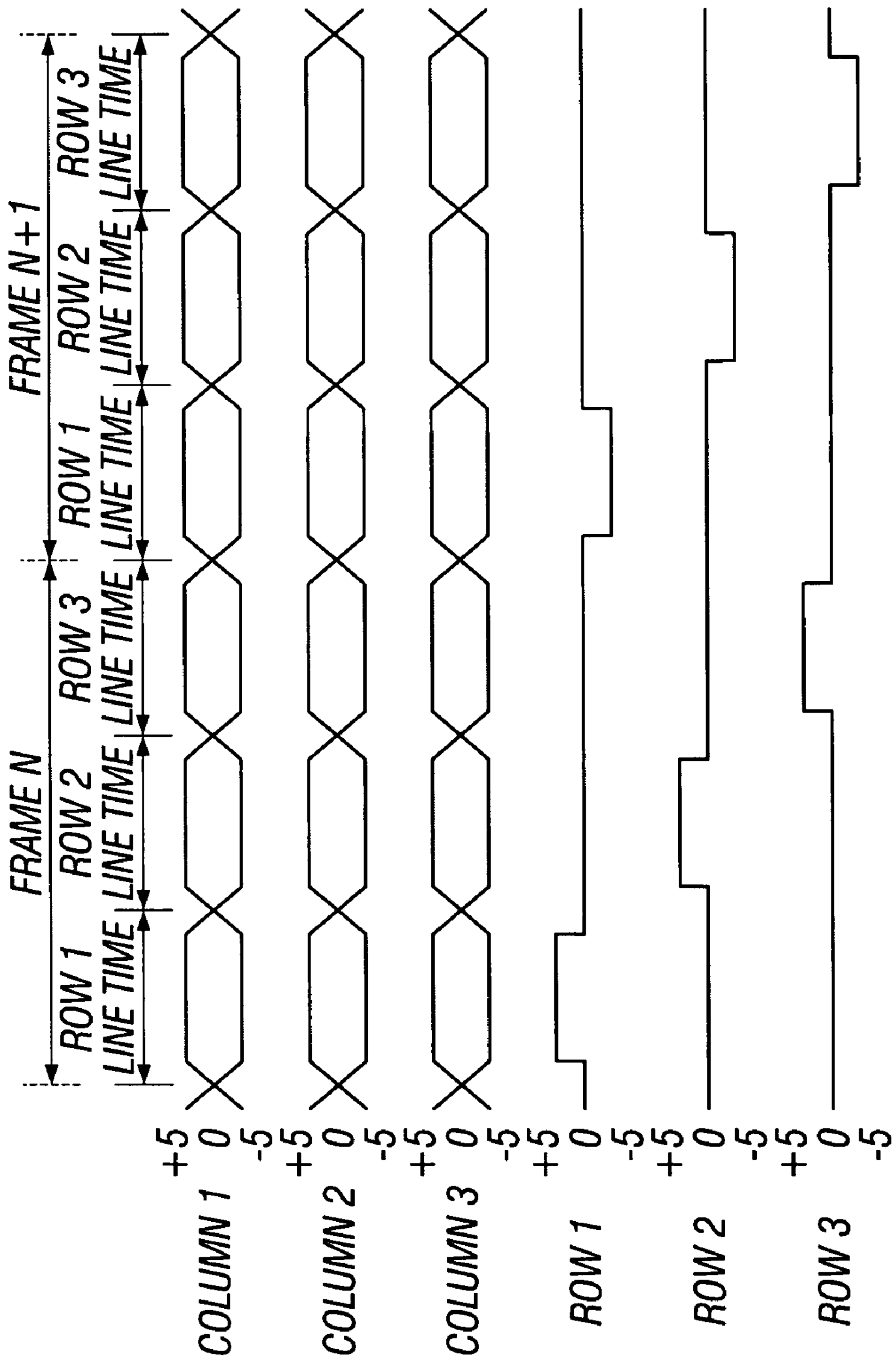
FIG. 8 is an exemplary timing diagram for row and column signals that may be used in one embodiment of the invention.

In FIG. 8, two frames of display data are written in sequence, frame N and frame N+1. In this Figure, the data for the columns goes valid for row 1 (i.e., either +5 or −5 depending on the desired state of the pixels in row 1) during the row 1 line time, valid for row 2 during the row 2 line time, and valid for row 3 during the row 3 line time. Frame N is written as shown in FIG. 5B, which will be termed positive polarity herein, with the row electrode 10 V above the column electrode during MEMS device actuation. During actuation, the column electrode may be at −5 V, and the scan voltage on the row is +5 V in this example. Such a frame is called a "write+" frame herein.

Frame N+1 is written with potentials of the opposite polarity from those of Frame N. For Frame N+1, the scan voltage is −5 V, and the column voltage is set to +5 V to actuate, and −5 V to release. Thus, in Frame N+1, the column voltage is 10 V above the row voltage, termed a negative polarity herein. Such a frame is called a "write−" frame herein. As the display is continually refreshed and/or updated, the polarity can be alternated between frames, with Frame N+2 being written in the same manner as Frame N, Frame N+3 written in the same manner as Frame N+1, and so on. In this way, actuation of pixels takes place in both polarities. In embodiments following this principle, potentials of opposite polarities are respectively applied to a given MEMS element at defined times and for defined time durations that depend on the rate at which image data is written to MEMS elements of the array, and the opposite potential differences are each applied an approximately equal amount of time over a given period of display use. This helps reduce charge buildup on the dielectric over time.

A wide variety of modifications of this scheme can be implemented. For example, Frame N and Frame N+1 can comprise different display data. Alternatively, it can be the same display data written twice to the array with opposite polarities.

Although these polarity reversals have been found to improve long term display performance, it has been found beneficial to perform these reversals in a relatively unpredictable manner, rather than alternating after every frame, for example. Reversing write polarity in a random, pseudo-random, or any relatively complicated pattern (whether deterministic or non-deterministic) helps prevent non-random patterns in the image data from becoming "synchronized" with the pattern of polarity reversals. Such synchronization can result in a long term bias in which some pixels are actuated using voltages of one polarity more often than the opposite polarity.

Figure 9:
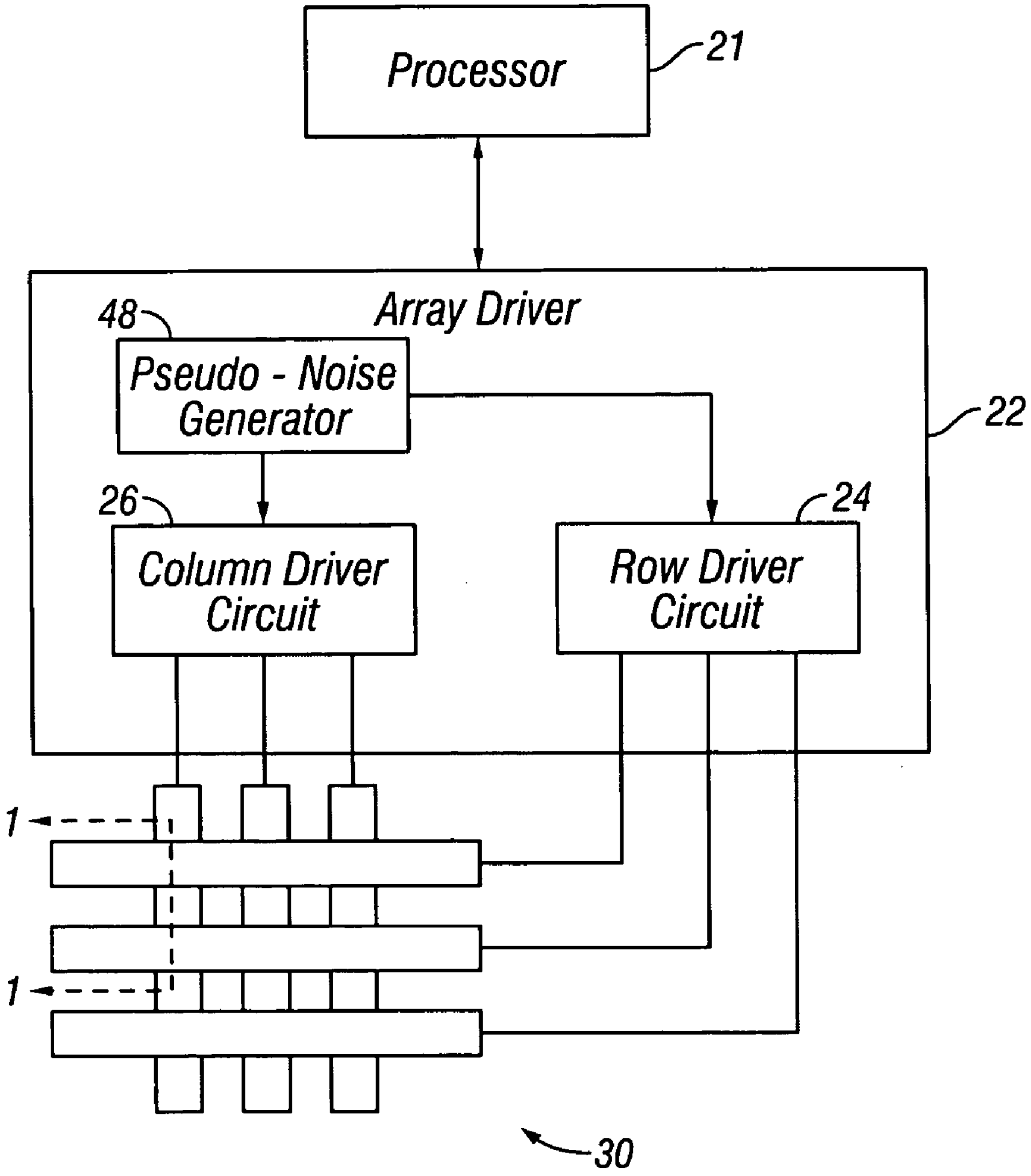
FIG. 9 is a block diagram of a display system in accordance with one embodiment of the invention.

In some embodiments, as illustrated in FIG. 9, a pseudo-noise generator 48, is used to produce a series of output bits, one per displayed frame. The output bit value may be used to determine whether the data is written with a positive polarity (a write+ or w+ frame) or negative polarity (a write− or w− frame). For example, output 1 could signify that the next frame is written positive polarity, and output 0 could indicate that the next frame is written with negative polarity. Alternatively, the output bit could determine whether the next frame is written with the same or opposite polarity of the previous frame. Thus, even though the pseudo noise generator can be designed to output, over a given time scale, exactly the same number of zeros and ones, producing a dc balanced writing process, the distribution of the zeros and ones over that time can be a essentially devoid of non-random patterns that could interact in undesirable ways with non-random patterns in the image data.

It will be appreciated that in general, an output bit can be generated every n rows written, where n can be any integer from 1 upward. If n=1, potential "flips" of polarity can occur as each row is written. If n is the number of rows of the display, polarity flips can occur with each new frame. Thus, the pseudo-noise generator can be configured to output a bit for every n rows as desired.

Figure 10A:
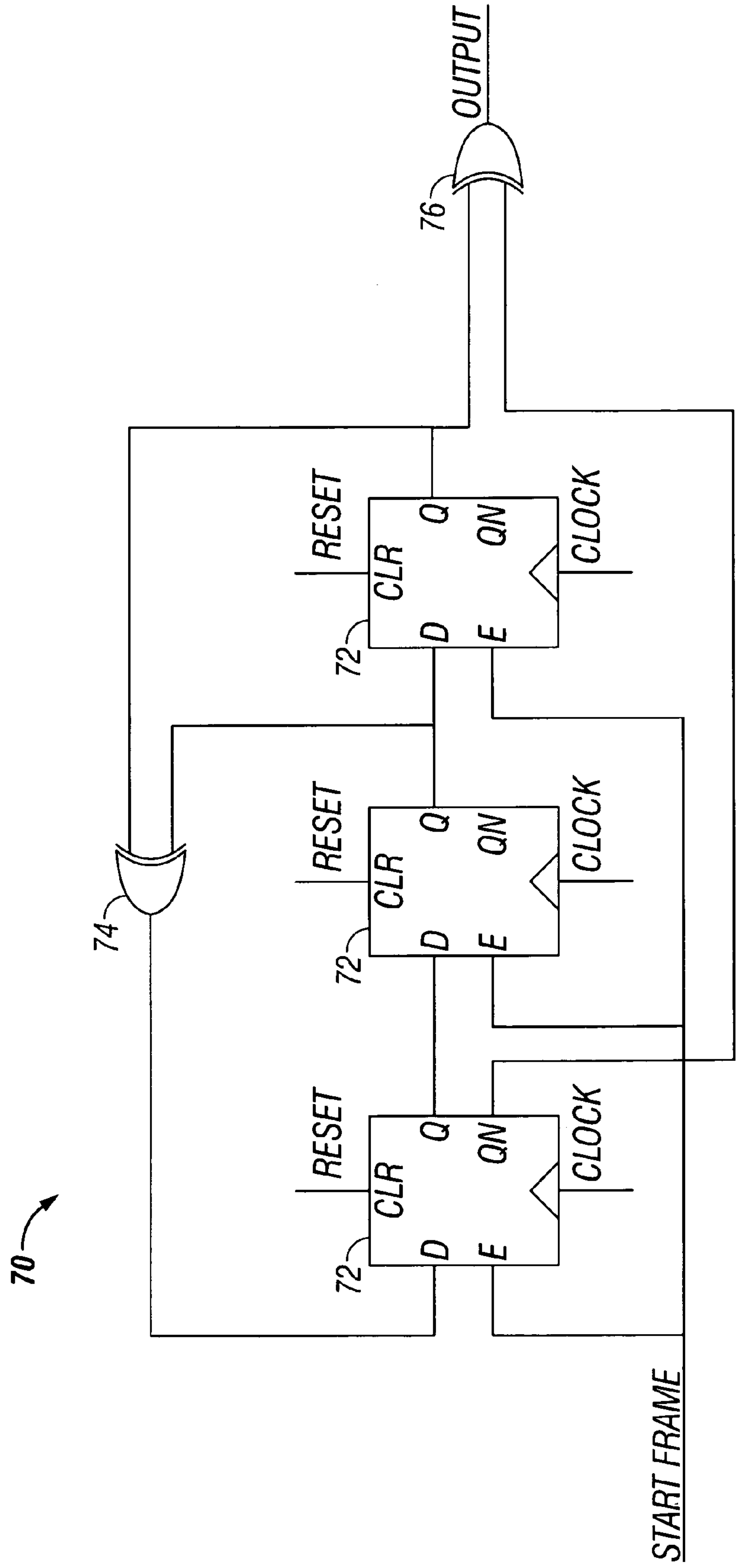
FIGS. 10A and 10B are schematic diagrams of embodiments of pseudo-noise generators.

FIG. 10A is a schematic diagram of an embodiment of a pseudo-noise generator. Various other pseudo-noise generators may also be used. As shown in FIG. 10A, pseudo-noise generator 70 has a number of registers 72, a feedback summer 74, and an output summer 76.

The registers 72 are serially connected, such that the output of each register 72, other than the last, is connected to the input of a next. The output of some of the registers 72, are connected to the feedback summer 74, which adds the outputs together to be provided to the input of the first register 72. The output of some of the registers 72, are connected to the output summer 76, which adds the outputs together to produce a single bit to be provided as the output of the pseudo-noise generator 70.

Pseudo-noise generator 70 is configured to start in a certain state and to produce a pseudo-random sequence of outputs, based on the summation of the register 72 outputs connected to the output summer 76. The specific characteristics of the pseudo-random sequence depends upon design details, such as the starting state, which register 72 outputs are provided to the feedback summer 74, and which register 72 outputs are provided to the output summer 76.

Pseudo-noise generators are often unbalanced. For a maximal-length pseudo-noise generator having N registers 72, there will be 2^(N−1) '1's and 2^(N−1)−1 '0's in the output sequence (i.e. one more '1' than '0'), with the maximum number of consecutive digits being N for '1's and N−1 for '0's. In some embodiments, different output characteristics may be desired.

In general, the specific characteristics of the output sequence can be controlled by design details. For example, the ratio of 1 outputs to 0 outputs of a sequence can be controlled. Some embodiments have substantially equal numbers of '1's and '0's. However, it is possible that variation from an exactly equal number is optimum because in some cases, the dielectric charging rate is not exactly symmetrical with polarity. In these cases, a long term bias toward one polarity may be best able to minimize charge buildup in the device. To accommodate this, the pseudo-noise generator can be designed to output a defined excess of 1's or 0's so as to produce a defined excess of write operations in one polarity rather than another. Any other ratio of 1 and 0 outputs may be produced by controlling the design details and by adding conditioning circuitry.

Figure 10B:
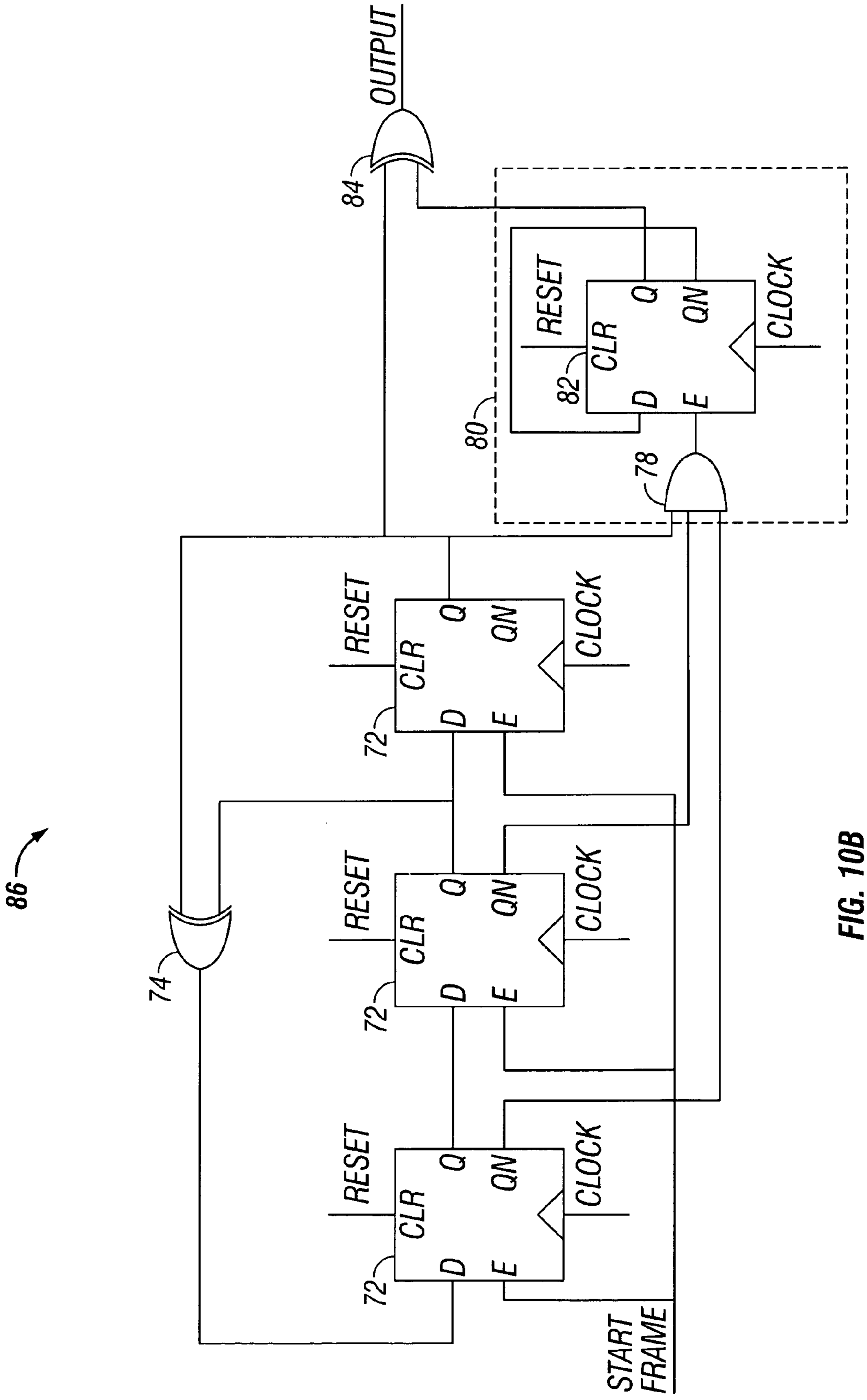

For example, FIG. 10B shows pseudo-noise generator 86 with additional conditioning circuitry 80 such that the output is exactly balanced, with equal numbers of '1's and '0's. The output or the inverse of the output of each register 72 is optionally provided to AND gate 78, which detects a toggle state of the pseudo-noise generator. Accordingly, because the pseudo-noise generator sequence repeats, the AND gate 78 will detect the toggle state once per pseudo-noise generator sequence cycle, and signal the ½ cycle clock 82. The ½ clock 82 produces an alternating signal with a period twice the period of the pseudo-noise generator sequence cycle.

The output of the ½ cycle clock 82 is provided to XOR gate 84 as a first input. XOR gate 84 has an output from the serially connected registers 72 as a second input. The XOR gate 84 operates such that the output of the pseudo-noise generator 86 is either the output from the registers 72 (when the output of the ½ cycle clock 82 is 0) or the inverse of the output from the registers 72 (when the output of the ½ cycle clock 82 is 1). Because the period of the ½ cycle clock is twice the period of the register output sequence cycle, even though the pseudo-noise generator output during one sequence cycle may be imbalanced, having, for example, one more 1 than 0, the pseudo-noise generator output for two cycles of the output will be balanced. This occurs because during one pseudo-noise generator output cycle, the XOR gate provides the output from the registers 72, having one more 1 than 0. However, during the second pseudo-noise generator output sequence cycle, the XOR gate provides the inverse of the output registers 72, having one more 0 than 1. Accordingly, over the entire two cycles, the output of the pseudo-noise generator 86 of FIG. 10B will have the same number of 0's as 1's.

Furthermore, by appropriately picking the right toggle state, it is possible to reduce the maximum number of consecutive '1's by one, so that the maximum number of consecutive '1's in the same as the maximum number of consecutive '0's (N−1).

In some embodiments, a pseudo-noise generator is used to determine the write polarity for each frame, group of frames, line or group of lines, as described above, and to output another pseudo-random bit for each row written according to the determined polarity. In these embodiments, the additional pseudo-random output may be used to determine the polarity of a "pre-write" process that applies a row strobe to a second row. In some embodiments, a first pseudo-noise generator determines a write polarity for a current row, and the current row is written with the write polarity. In embodiments using a "pre-write" process, a second pseudo-noise generator determines a pre-write polarity for another row, such as a next row, and the other row is written substantially simultaneously with the first row with the determined pre-write polarity. Row strobes are thus applied to two rows at one time, row i and row i+1, for example. The polarity of the row i strobe (e.g. whether the strobe is a −5 volt strobe or a +5 volt strobe) is determined by the output bit of the first pseudo-noise generator, and the polarity of the row i+1 strobe is determined by the output bit of the second pseudo-noise generator. Because the same data is presented to the columns (segments) during the simultaneous row i and row i+1 strobes, either the same data or the inverse of the data which is written to row i will be substantially simultaneously written to row i+1, depending on whether the determined polarity for the i row and for the i+1 row are the same or opposite. In some embodiments the first pseudo-noise generator is unbalanced, such as is shown in FIG. 10A, and the second pseudo-noise generator is balanced, as shown in FIG. 10B. It is preferable for these two pseudo-noise generators to be independent with independent sequences and/or sequence lengths. This ensures that the outputs do not become correlated with each other. It will further be appreciated that a variety of techniques can be used to produce bit sequences having a sufficiently random character to be useful in the present context, with physical white noise generators being one possible example.

Figure 11:
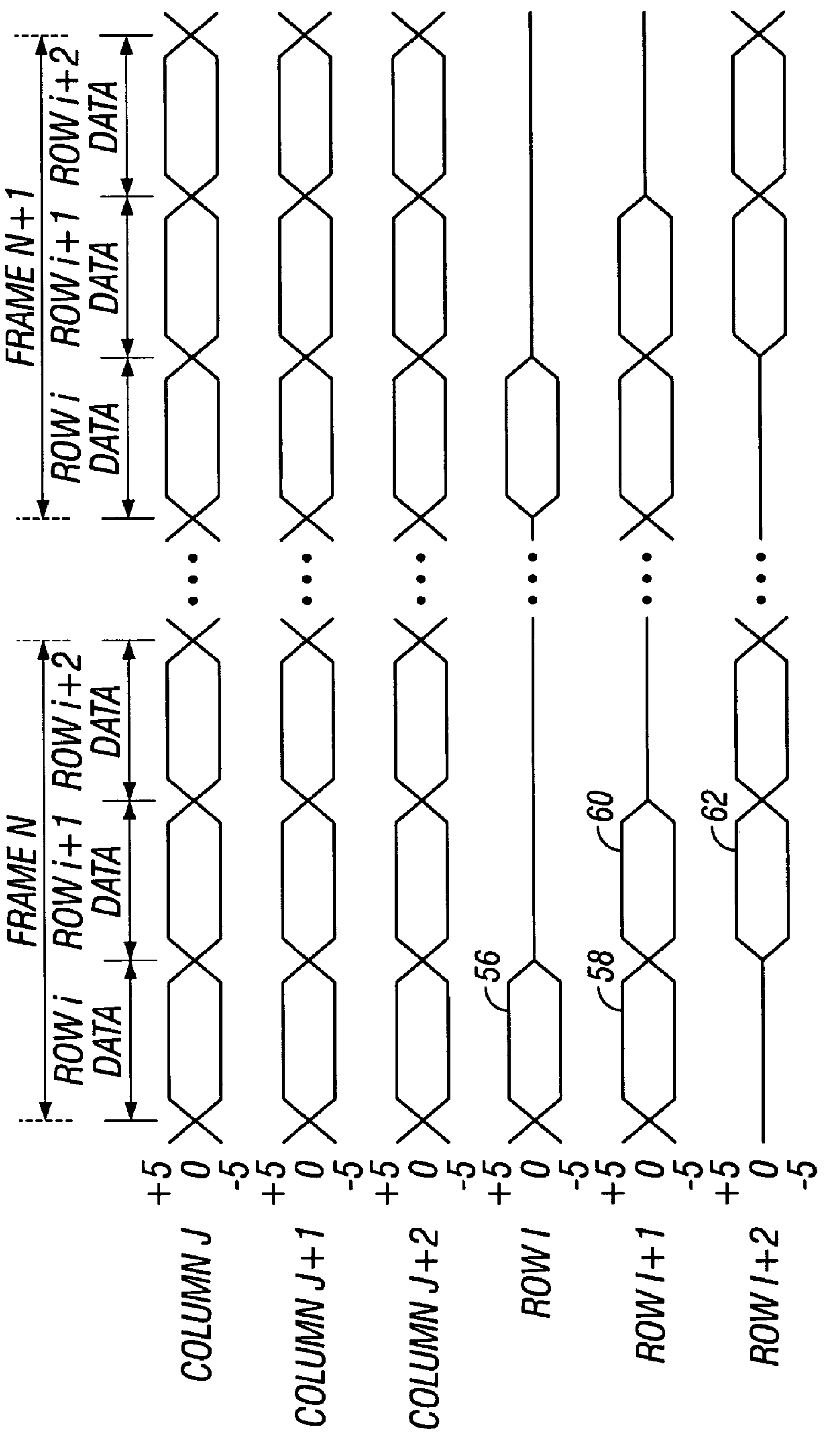
FIG. 11 is a timing diagram showing options for row write and pre-write polarities.

One embodiment of this is illustrated in FIG. 11. A row strobe 56 is applied to row i while data for row i is presented on the columns, thus writing row i with the row i data as described in detail above. As shown in this embodiment, writing the row i can be either a write+ or a write− operation. As described above, which type of write operation is used may be determined by the first pseudo-noise generator.

At the same time, another row strobe 58 is applied to row i+1, thus pre-writing row i+1 either with the row i data or with the inverse of row i data, according to whether the polarity of the row strobe 56 is the same as or opposite to the polarity of the second row strobe 58. For example, if the write operations of the first row and the second row during strobes 56 and 58 are either both write+ or both write− operations, the data written to the first row and pre-written to the second row is the row i data. However, if the write operations of the first row and the second row are different operations (one write+ and the other write−), the data written to row i will be the row i data, and the data pre-written to the row i+1 will be the inverse of the row i data.

The application of row strobe 60 and row strobe 62 is similar to the application of row strobes 56 and 58, described above. The row strobe 60 is applied to row i+1 and row strobe 62 is applied to row i+2 while row i+1 data is presented to the columns. As a result, either the same data or the inverse of the data which is written to row i will be simultaneously written to row i+1, depending on whether the row strobes for the i+1 row and for the i+2 row correspond to common or opposite write polarities.

This is repeated for all the rows of the display to write Frame N. Utilizing these pre-scans helps reduce differential aging between different pixels of the display, and also reduces the probability that any given pixel will become stuck in the actuated position. This can be especially beneficial in interferometric modulator pixels and OLED pixels. It will further be appreciated that these principles can be applied to active matrix displays that are configured to write one pixel at a time rather than a whole row at a time. In these embodiments, a pre-write process can be performed on a pixel that will be written later in the frame write process rather than a whole row that will be written later in the frame write process.

In some embodiments, the polarities of all of the row writes for a frame is the same, while in other embodiments the polarities of the writes for sets of rows varies according to a pseudo-noise generator. In some embodiments, the polarities of all of the row pre-writes for a frame is the same, while in other embodiments the polarities of the pre-writes of all or of sets of rows varies according to the pseudo-noise generator. In some embodiments, the polarity of at least some pre-writes is based on one or more write polarities of the same and/or a previous row. In some embodiments, the polarity is based on one or more pre-write polarities of a previous row. In some embodiments, at least some pre-write polarities are independent of the writes or pre-writes of other rows.

In some embodiments, polarities of the writes of at least some of the row writes is based at least in part on the polarity of one or more row writes of a previous frame, while in other embodiments the polarities of the row writes is independent of polarities of previous frames. For example, each row of a frame N may be written with a polarity separately determined by the pseudo-noise generator. Then, rows of following frames may be based on the polarity of the rows of frame N.

In one example embodiment, a balanced pseudo-noise generator, such as pseudo-noise generator 86 of FIG. 10B is used to determine the polarity of row writes for a frame. For example, when the output of the balanced pseudo-noise generator is 0 the rows of the frame are written with a write+ operation, and when the output of the balanced pseudo-noise generator is 1, the rows of the frame are written with a write− operation. The use of the balanced pseudo-noise generator results in each row being written with the same number of write+ and write− operations over a given time scale. Additionally, an unbalanced pseudo-noise generator, such as pseudo-noise generator 70 of FIG. 10A is used to determine the polarity of row pre-writes for the frame. In one embodiment, if the output of the unbalanced pseudo-noise generator=0, the pre-write has the same polarity as the corresponding write, and if the output of the unbalanced pseudo-noise generator=1, the pre-write has the opposite polarity as the corresponding write. In this application the precise balancing of the pre-write operations is not necessary, and therefore the simpler unbalanced pseudo-noise generator can advantageously be used.

Figure 12:
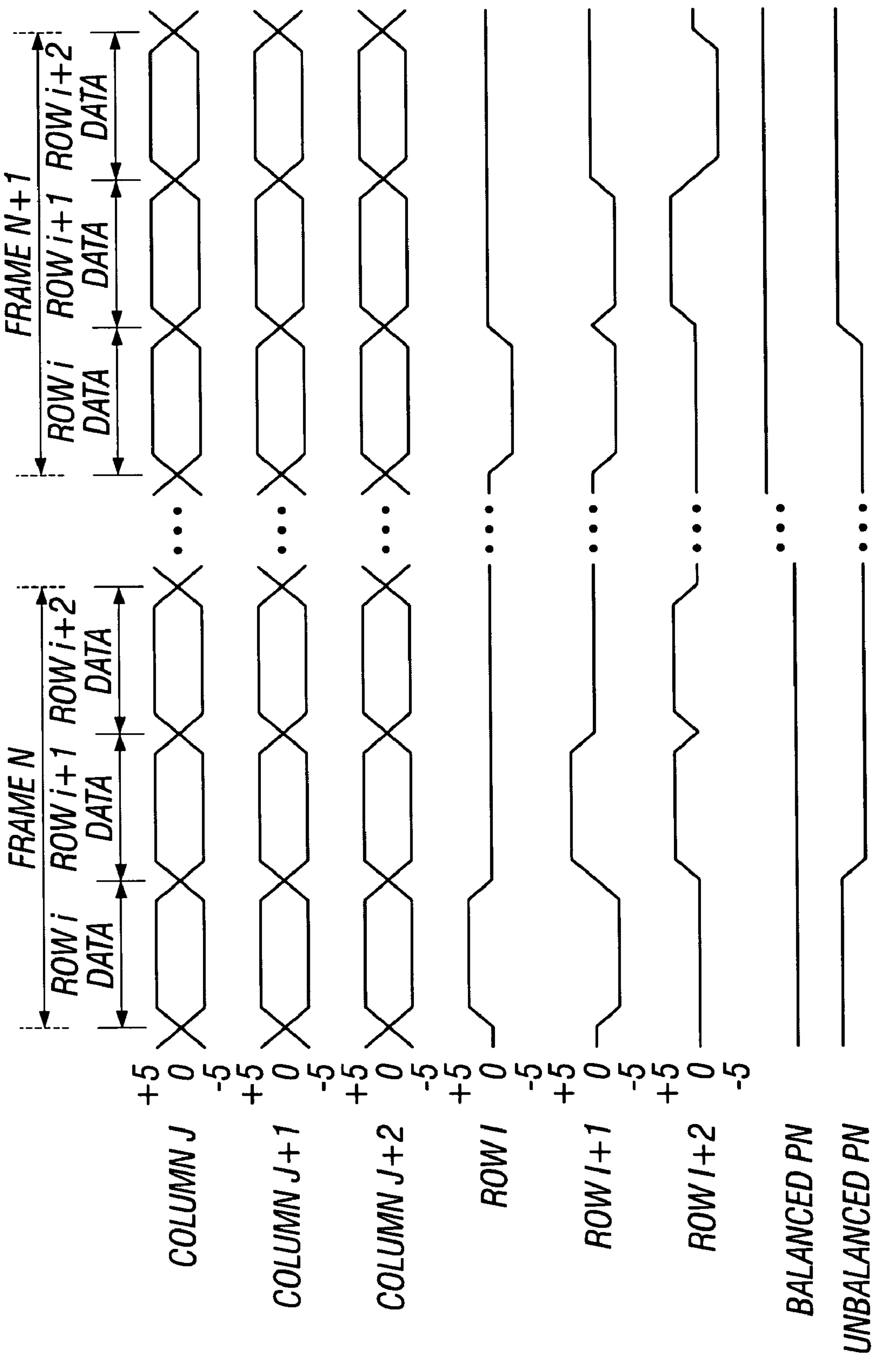
FIG. 12 is a timing diagram of an embodiment with certain polarities.

FIG. 12 is a timing diagram of such an embodiment. The polarities of the writes and pre-writes depend on the outputs of the balanced and unbalanced pseudo-noise generators. In this embodiment the balanced pseudo-noise generator generates one output for each frame, and the unbalanced pseudo-noise generator generates one output per row. As shown, during frame N the output of the balanced pseudo-noise generator is 0, and the rows of the frame are written with a write+ operation, and during frame N+1 the output of the balanced pseudo-noise generator is 1, and the rows of the frame are written with a write-operation. Also, during the pre-write of row i+1 of frame N, because the output of the unbalanced pseudo-noise generator is 1, the row i+1 pre-write is of opposite polarity as the write of row i. Conversely, during the pre-write of row i+2 of frame N, because the output of the unbalanced pseudo-noise generator is 0, the row i+2 pre-write is of the same polarity as the write of row i+1. Also, during the pre-write of row i+1 of frame N+1, because the output of the unbalanced pseudo-noise generator is 0, the row i+1 pre-write is of the same polarity as the write of row i. Conversely, during the pre-write of row i+2 of frame N+1, because the output of the unbalanced pseudo-noise generator is 1, the row i+2 pre-write is of opposite polarity as the write of row i+1.

The rows that are simultaneously strobed need not be adjacent. In general, when writing a frame of data, the second row being strobed with the other row data can be any row of the array that has not yet been written with its own correct image data. These embodiments are generally less visually desirable, but can be utilized.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of writing data to an array of electromechanical devices, each having first and second input electrodes, wherein each electromechanical device is configured to be in an actuated state when a voltage difference between the first and second input electrodes is above a threshold, wherein the voltage difference has one of first and second polarities, the method comprising:
- randomly or pseudo-randomly selecting between the first and second polarities for a first row of the array;
- randomly or pseudo-randomly selecting between the first and second polarities for a second row of the array;
- selecting a first voltage for the first input electrode of the first and second rows of the array according to the selected polarities of the first and second rows;
- selecting a second voltage for the second input electrode of the first and second rows of the array according to the selected polarities of the first and second rows; and
- simultaneously applying the first and second voltages across the first and second input electrodes of a plurality of devices in first and second rows of the array, the applied voltages having a difference above the threshold and having a polarity based on the selected polarity, wherein each of the first and second rows of the array display an image according to the first and second voltages, the image of the second row being the same or the inverse of the first row, according to the selected polarity of each row.

2. The method of claim 1, further comprising repeatedly applying voltage differences across the first and second electrodes, wherein each of the repeatedly applied voltage differences has a randomly or pseudo-randomly selected polarity.

3. The method of claim 2, wherein the polarity is repeatedly selected such that after a number of selections, the number of first polarity selections exactly equals the number of second polarity selections.

4. The method of claim 2, wherein the polarity is repeatedly selected such that after a number of selections, the number of first polarity selections is different from the number of second polarity selections by a predetermined amount.

5. The method of claim 1, wherein the polarity is repeatedly selected such that the maximum number of consecutive occurrences of the first polarity is the same as the maximum number of consecutive occurrences of the second polarity.

6. A method of writing data to an array of electromechanical devices, wherein each device has first and second input electrodes and is configured to be in a first state when a voltage difference between the first and second input electrodes is below a first threshold, and to be in a second state when the voltage difference between the first and second input electrodes is above a second threshold, wherein the voltage difference has one of first and second polarities, the method comprising:
- randomly or pseudo-randomly selecting one of the first and second polarities for a first row of the array;
- randomly or pseudo-randomly selecting between the first and second polarities for a second row of the array;
- selecting first and second row strobe values according to the selected polarity;
- selecting first and second voltages for the first input electrodes of each row according to the randomly or pseudo-randomly selected polarity of each row;
- simultaneously applying the first strobe value to the first row of the array and the second row strobe value to the second row of the array, wherein each of the first and second rows of the array display an image according to the first and second voltages, the image of the second row being the same or the inverse of the first row, according to the selected polarity of each row.

7. The method of claim 6, further comprising repeatedly applying row strobe values to the first row, wherein each of the repeatedly applied row strobe values has a randomly or pseudo-randomly selected polarity.

8. The method of claim 7, wherein the polarity is repeatedly selected such that after a number of selections, the number of first polarity selections exactly equals the number of second polarity selections.

9. The method of claim 7, wherein the polarity is repeatedly selected such that the maximum number of consecutive occurrences of the first polarity is the same as the maximum number of consecutive occurrences of the second polarity.

10. The method of claim 6, further comprising applying the first row strobe value to a plurality of rows of the array.

11. The method of claim 10, wherein the plurality of rows comprises substantially all of the rows of the array.

12. The method of claim 6, wherein applying the first and second row strobe values occur within the same frame period.

13. The method of claim 6, wherein the first and second rows are adjacent.

14. A method of writing data to an array of electromechanical devices, wherein each device has first and second input electrodes and is configured to be in a first state when a voltage difference between the first and second electrodes is below a first threshold, and to be in a second state when the voltage difference between the first and second electrodes is above a second threshold, wherein the voltage difference has one of first and second polarities, the method comprising:
- applying image data to one or more columns of the array; and
- substantially simultaneously applying first and second row strobes to first and second rows of the array, respectively, wherein each of the first and second rows of the array display an image according to the image data, the image of the second row being the same or the inverse of the first row, according to the selected polarity of each row.

15. The method of claim 14, wherein the value of the first row strobe is randomly or pseudo-randomly selected from values corresponding to the first and second polarities.

16. The method of claim 14, wherein the value of the first row strobe is repeatedly selected such that after a number of selections, the number of first row strobe value selections corresponding to the first polarity exactly equals the number of first row strobe value selections corresponding to the second polarity.

17. The method of claim 14, wherein the polarity is repeatedly selected such that the maximum number of consecutive occurrences of first row strobe value selections corresponding to the first polarity is the same as the maximum number of consecutive occurrences of first row strobe value selections corresponding to the second polarity.

18. The method of claim 14, wherein the value of the second row strobe is randomly or pseudo-randomly selected from values corresponding to first and second polarities.

19. The method of claim 14, wherein the first and second rows are adjacent.

20. The method of claim 14, wherein said first and second rows are not adjacent.

21. A method of writing data to an array of micro-electromechanical system (MEMS) devices, the method comprising:
- randomly or pseudo-randomly selecting a first strobe value for a first portion of the array;
- writing image data to the first portion of the array according to the first strobe value;

randomly or pseudo-randomly selecting a second strobe value for a second portion of the array;

writing either the same image data or the inverse of the image data to the second portion of the array according to the second strobe value; and applying image data to one or more columns of the array;

wherein writing to the first portion and writing to the second portion occur substantially simultaneously and the first and second portions display an image according to the first and second strobe values, the image of the second portion being the same or the inverse of the first portion according to the selected strobe value for each portion.

22. The method of claim 21, wherein said portions are different rows of the array.

23. The method of claim 22, wherein the first and second rows are adjacent.

24. The method of claim 21, further comprising:

writing second image data to the second portion of the array; and writing either the same second image data or the inverse of the same second image data to a third portion of the array.

25. An electromechanical device, comprising:

an array of MEMS elements, wherein each element has first and second input electrodes and is configured to be in a first state when the voltage difference between the first and second electrodes is below a first threshold, and to be in a second state when the voltage difference between the first and second electrodes is above a second threshold, wherein the voltage difference has one of first and second polarities;

means for randomly or pseudo-randomly selecting one of the first and second polarities for a first row of the array;

means for randomly or pseudo-randomly selecting one of the first and second polarities for a second row of the array;

means for selecting first and second voltages for the first electrodes according to the randomly or pseudo-randomly selected polarity;

means for selecting first and second row strobe values according to the selected polarity;

means for simultaneously applying the first row strobe value to the first row of the array and the second row strobe value to the second row of the array, wherein each of the first and second rows of the array display an image according to the first and second voltages, the image of the second row being the same or the inverse of the first row, according to the selected polarity of each row.

26. The device of claim 25, wherein said means for randomly or pseudo-randomly selecting between the first and second polarities comprises a PN generator.

27. The device of claim 26, wherein said means for applying comprises a driver circuit.

28. An array of micro-electromechanical system (MEMS) devices, comprising:

means for randomly or pseudo-randomly selecting a first strobe value for a first portion of the array and a second strobe value for a second portion of the array;

means for writing image data to the first portion of the array according to the first strobe value;

means for applying image data to one or more columns of the array; and means for substantially simultaneously writing either the same image data or the inverse of the image data to the second portion of the array according to the second strobe value.

29. The device of claim 28, wherein both of said means comprise a common driver circuit.

30. The method of claim 6, wherein the first and second row strobe values have the same polarity.

31. The method of claim 6, wherein the first and second row strobe values have opposite polarities.

32. The method of claim 14, wherein the first and second row strobes have the same polarity.

33. The method of claim 14, wherein the first and second row strobes have opposite polarities.

34. The device of claim 25, wherein the first and second row strobe values have the same polarity.

35. The device of claim 25, wherein the first and second row strobe values have opposite polarities.

* * * * *